(12) United States Patent
Nagao

(10) Patent No.: US 10,055,511 B2
(45) Date of Patent: Aug. 21, 2018

(54) SEARCH DEVICE, SEARCH METHOD, AND COMPUTER PROGRAM PRODUCT

(71) Applicant: KABUSHIKI KAISHA TOSHIBA, Minato-ku, Tokyo (JP)

(72) Inventor: Manabu Nagao, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 629 days.

(21) Appl. No.: 14/574,886

(22) Filed: Dec. 18, 2014

(65) Prior Publication Data

US 2015/0178285 A1 Jun. 25, 2015

(30) Foreign Application Priority Data

Dec. 24, 2013 (JP) .................. 2013-266006

(51) Int. Cl.
*G06F 17/30* (2006.01)

(52) U.S. Cl.
CPC .............. *G06F 17/30985* (2013.01)

(58) Field of Classification Search
CPC ......... G06F 17/30864; G06F 17/30867; G06F 17/30675; G06F 17/30985; G06F 13/30882; G06Q 30/02
See application file for complete search history.

(56) References Cited

U.S. PATENT DOCUMENTS 6,424,983 B1 * 7/2002 Schabes ............. G06F 17/273
704/9

(Continued)

FOREIGN PATENT DOCUMENTS

JP 11-259087 9/1999
JP 2003-271180 9/2003
(Continued)

OTHER PUBLICATIONS

M. Mohri, et al. "An efficient algorithm for the N-best-strings problem," in Proceedings of the International Conference on Spoken Language Processing (ICSLP '02), pp. 1313-1316, 2002.
M. Mohri. "Semiring frameworks and algorithms for shortest-distance problems," Journal of Automata, Languages and Combinatorics, vol. 7, pp. 321-350, 2002.

*Primary Examiner* — Cam-Y Truong

(74) *Attorney, Agent, or Firm* — Amin, Turocy & Watson LLP

(57) ABSTRACT

According to an embodiment, a search device searches paths of a digraph and includes a retriever, and an expander. The retriever is configured to, from among hypotheses stored in a storage, retrieve, as a target hypothesis, a single hypothesis for which a weight obtained by addition of a weight of an already-searched path corresponding to each hypothesis and a weight of the best path from a state of the head of concerned path to a final state is the best weight. The expander is configured to, when the retrieved target hypothesis is not a final hypothesis for which the search has been completed up to a final state, generate new hypotheses each holding an input symbol string that is present in a path in which the search has been performed from states held by the target hypothesis until finding a single input symbol, and write the generated hypotheses in the storage.

11 Claims, 6 Drawing Sheets

(56) References Cited

U.S. PATENT DOCUMENTS

| | | |
|---|---|---|
| 6,587,844 B1 | 7/2003 | Mohri |
| 7,571,098 B1 | 8/2009 | Gorin et al. |
| 7,711,561 B2 | 5/2010 | Hogenhout et al. |
| 7,895,040 B2 | 2/2011 | Sakai et al. |
| 7,957,971 B2 | 6/2011 | Gorin et al. |
| 8,234,115 B2 | 7/2012 | Mohri et al. |
| 8,275,730 B2 | 9/2012 | Nagao |
| 8,311,825 B2 | 11/2012 | Chen |
| 8,744,836 B2 | 6/2014 | Nagao |
| 2012/0221330 A1* | 8/2012 | Thambiratnam ....... G10L 25/84 704/235 |
| 2012/0296648 A1 | 11/2012 | Mohri et al. |
| 2013/0073503 A1 | 3/2013 | Nagao |
| 2013/0073564 A1 | 3/2013 | Nagao |
| 2013/0108160 A1 | 5/2013 | Yamazoe et al. |
| 2013/0179158 A1 | 7/2013 | Nakamura et al. |

FOREIGN PATENT DOCUMENTS

| | | |
|---|---|---|
| JP | 2007-033671 | 2/2007 |
| JP | 2009-058989 | 3/2009 |
| JP | 4241771 | 3/2009 |
| JP | 4322815 | 9/2009 |
| JP | 2011-198126 | 10/2011 |
| JP | 4956334 | 6/2012 |
| JP | 4977163 | 7/2012 |
| JP | 2012-185722 | 9/2012 |
| JP | 2012-185772 | 9/2012 |
| JP | 5121650 | 1/2013 |
| JP | 2013-065188 | 4/2013 |
| JP | 2013-164572 | 8/2013 |

OTHER PUBLICATIONS

D. Povey, et al. "Generating exact lattices in the WFST framework," in Proceedings of the International Conference on Acoustics, Speech, and Signal Processing (ICASSP '12), pp. 4213-4216, 2012.

Y. Guo, et al. "Lattice generation with accurate word boundary in WFST framework," 5th International Congress on Image and Signal Processing (CISP), pp. 1592-1595, 2012.

G. Saon, et al. "Anatomy of an extremely fast LVCSR decoder," in Proceedings of the INTERSPEECH, 2005, pp. 549-552, Sep. 4-8, 2005, Lisbon, Portugal.

Yen-Lu Chow, et al. "The N-best algorithm: an efficient procedure for finding top N sentence hypotheses," in Proceedings of the Workshop on Speech and Natural Language, pp. 199-202, 1989.

R. Schwartz, et al. "The N-best algorithm: an efficient and exact procedure for finding the N most likely sentence hypotheses," in Proceedings of the International Conference on Acoustics, Speech, and Signal Processing (ICASSP '90), pp. 81-84, 1990.

R. Schwartz, et al. "Efficient, high-performance algorithms for N-best search," in Proceedings of the Workshop on Speech and Natural Language, pp. 6-11, 1990.

F. K. Soong, et al. "A tree-trellis based fast search for finding the N best sentence hypotheses in continuous speech recognition," in Proceedings of the International Conference on Acoustics, Speech, and Signal Processing (ICASSP '91), 1991, pp. 705-708, vol. 1.

R. Schwartz, et al. "A comparison of several approximate algorithms for finding multiple (N-best) sentence hypotheses," in Proceedings of the International Conference on Acoustics, Speech, and Signal Processing (ICASSP '91), pp. 701-704, 1991.

Bach-Hiep Iran, et al. "A word graph based N-best search in continuous speech recognition," in Proceedings of the Fourth International Conference on Spoken Language Processing (ICSLP '96), pp. 2127-2130, 1996.

* cited by examiner

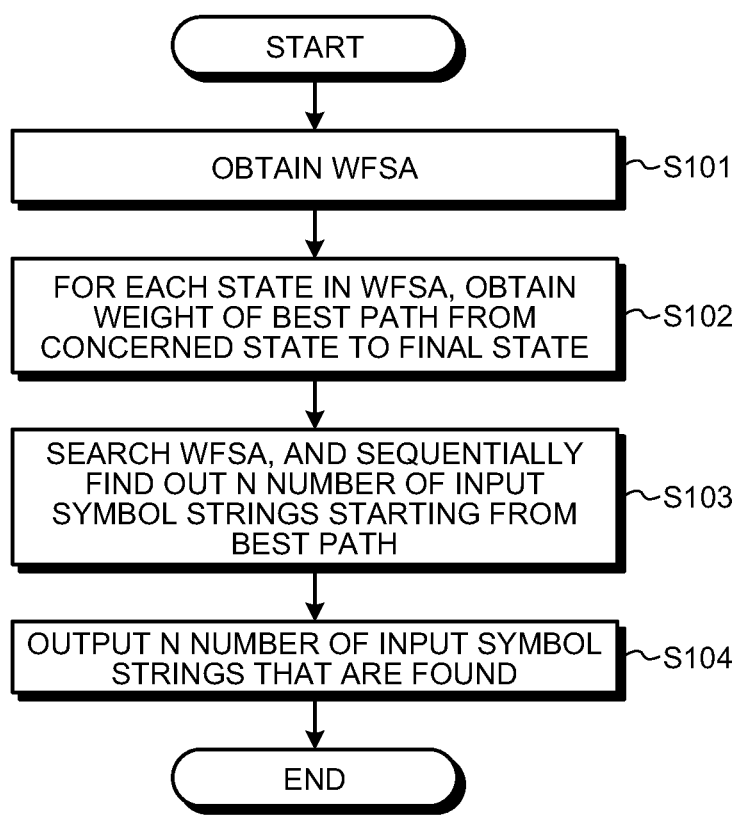

FIG.4 find_nbest($N$)
1.    $s \leftarrow \bigcup_{i \in I} \{(i, \lambda(i))\}$
2.    push $\left(S, \left(s, \bigoplus_{(q,w) \in s} w \otimes w_{\text{pred}}(q), \text{false}, \varepsilon\right)\right)$
3.    while $S \neq \emptyset$
4.      $(s, \cdot, f, r) \leftarrow \text{pop}(S)$
5.      if $f = \text{true}$
6.        $R \leftarrow R \cup \{(|R| + 1, r)\}$
7.        if $|R| = N$
8.          return $R$
9.      else
10.        $s \leftarrow \text{eps\_shortest}(s)$
11.        $s_f \leftarrow \{(q, w) \in s \mid q \in F\}$
12.        if $s_f \neq \emptyset$
13.          push $\left(S, \left(s_f, \bigoplus_{(q,w) \in s_f} w \otimes \rho(q), \text{true}, r\right)\right)$
14.        foreach $a \in \Sigma$
15.          $s_a \leftarrow \bigcup_{(q,w) \in s} \{(q_n, w \otimes w(e)) \mid e \in E, \text{p}(e) = q, \text{n}(e) = q_n, \text{i}(e) = a\}$
16.        if $s_a \neq \emptyset$
17.          push $\left(S, \left(s_a, \bigoplus_{(q,w) \in s_a} \{w \otimes w_{\text{pred}}(q)\}, \text{false}, r \cdot a\right)\right)$
18. return $R$

FIG.5 eps_shortest($s$)
1.    foreach $q \in Q$
2.      $w_\varepsilon[q] \leftarrow 0^\#$
3.    $Q_r \leftarrow \emptyset$
4.    foreach $(q, w) \in s$
5.      $w_\varepsilon[q] \leftarrow w$
6.      push $(\Psi, q)$
7.    while $\Psi \neq \emptyset$
8.      $q \leftarrow \text{pop}(\Psi)$
9.      if $q \in F \vee \{e \in E \mid \text{p}(e) = q, \text{i}(e) \neq \varepsilon\} \neq \emptyset$
10.        $Q_r \leftarrow Q_r \cup \{q\}$
11.      foreach $e \in E$ such that $\text{p}(e) = q \wedge \text{i}(e) = \varepsilon$
12.        $w \leftarrow w_\varepsilon[q] \otimes w(e)$
13.        if $w \oplus w_\varepsilon[\text{n}(e)] \neq w_\varepsilon[\text{n}(e)]$
14.          $w_\varepsilon[\text{n}(e)] \leftarrow w$
15.          push$(\Psi, \text{n}(e))$
16. return $\{(q, w_\varepsilon[q]) \mid q \in Q_r\}$

SEARCH DEVICE, SEARCH METHOD, AND COMPUTER PROGRAM PRODUCT

CROSS-REFERENCE TO RELATED APPLICATION

This application is based upon and claims the benefit of priority from Japanese Patent Application No. 2013-266006, filed on Dec. 24, 2013; the entire contents of which are incorporated herein by reference.

FIELD

Embodiments described herein relate generally to a search device, a search method, and a computer program product.

BACKGROUND

In pattern recognition, there are times when the candidates of a pattern recognition result with respect to an input signal are output using a weighted finite state automaton (WFSA) or an equivalent model to a WFSA. For example, in speech recognition, there are times when a word lattice is output as the result of recognizing an input speech. The word lattice can be expressed as a WFSA by assigning words to input symbols while using word scores as weights.

In pattern recognition, instead of outputting only a single most plausible result corresponding to the input signal, there are times when plausible results from the most plausible result to the N-th most plausible result (where N is an integer equal to or greater than 2) are output. As a result of outputting N number of results, even if the most plausible result is not correct, the user can correct the error by selecting a plausible result from the second plausible result onward. Moreover, if the plausibility is recalculated using a different model, then the most plausible result can be replaced with the plausible result of recalculation. In order to output N number of results, the WFSA obtained from the input signal is searched and N-th best path needs to be found from among the paths present from the initial state to final states.

Meanwhile, there are times when the N-th best path is required in a situation other than pattern recognition. For example, it is possible to consider a case in which N number of paths from a particular railway station to a different railway station are to be displayed in ascending order of the travel time. In that case, with the travel time between the railway stations serving as the weight, either a WFSA can be created in which the station names are assigned to input symbols or an equivalent model to that WFSA can be created, and the N-th best path can be found.

Sometimes, a WFSA includes a plurality of paths in which an identical input symbol string can be obtained. Such a WFSA is called a non-deterministic weighted finite state automaton (a non-deterministic WFSA). However, even if N number of paths are found in order of most suitable weights from such a non-deterministic WFSA, there are times when the paths having different input symbol strings are smaller in number than the number N. Usually, when N number of results are required, it is necessary to output N number of different input symbol strings. For example, consider a case in which three results of pattern recognition are displayed, that is, three input symbol strings are displayed as selection candidates to the user. If all the three displayed results are identical, then selection of any one of the candidates leads to the same result. Hence, it is meaningless to display the selection candidates. Thus, it is necessary to output a plurality of non-duplicative input symbol strings in order of most suitable weights of the corresponding paths.

However, in the case in which a WFSA has empty ($\varepsilon$) input symbols assigned therein, it becomes difficult to find out a plurality of non-duplicative input symbol strings.

BRIEF DESCRIPTION OF THE DRAWINGS

FIG. 3 is a diagram illustrating a process flow performed by the search device according to the embodiment;

FIG. 4 is a diagram illustrating a pseudo code for the operations performed in the search device according to the embodiment;

FIG. 5 is a diagram illustrating a pseudo code for the operations of a function;

DETAILED DESCRIPTION

Figure 1:
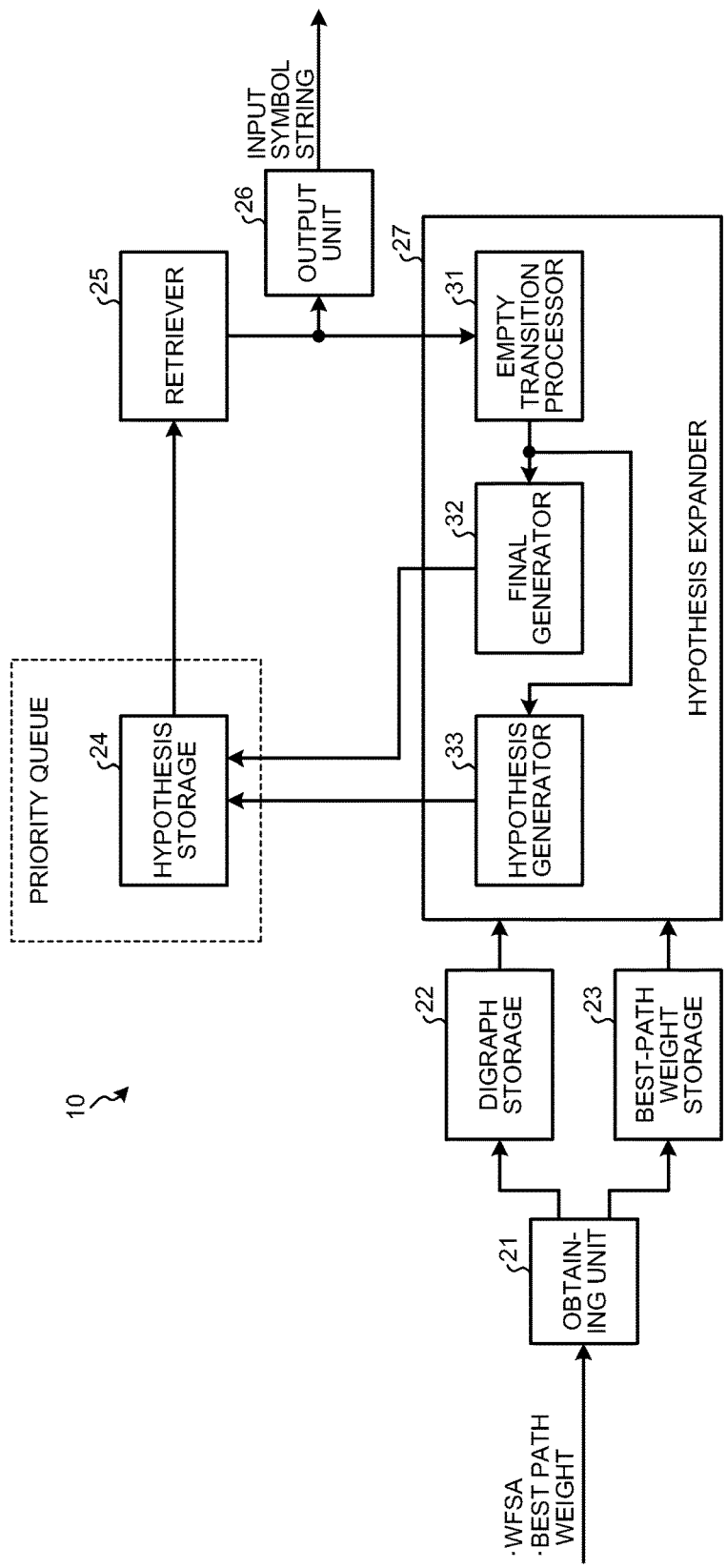
FIG. 1 is a diagram illustrating a configuration of a search device according to an embodiment.

According to an embodiment, a search device searches paths of a digraph which has input symbols and weights assigned thereto. The device includes a hypothesis storage, a retriever, and a hypothesis expander. The hypothesis storage is configured to store one or more hypotheses each representing information which holds an input symbol string and one or more state of the head of each of the paths from which the input symbol string is obtained, the input symbol string being obtained by searching the paths from an initial state of the digraph. The retriever is configured to, from among one or more hypotheses stored in the hypothesis storage, retrieve, as a target hypothesis, a single hypothesis for which a weight obtained by addition of a weight of an already-searched path corresponding to each hypothesis and a weight of the best path from the state of the head of concerned path to a final state is the best weight and which holds an input symbol string corresponding to the already-searched path. The hypothesis expander is configured to, when the retrieved target hypothesis is not a final hypothesis for which the search has been completed up to a final state, generate one or more new hypotheses each holding an input symbol string that is present in a path in which the search has been performed from one or more states held by the target hypothesis until finding a single input symbol, and write the generated hypotheses in the hypothesis storage. The retriever repeatedly retrieves the target hypothesis from the hypothesis storage until a predetermined number of the final hypothesis is retrieved. When an outgoing transition from each of one or more states held by the target hypothesis includes an empty transition, the hypothesis expander adds to the target hypothesis a state reached by following the empty transition from concerned state and then continues with the search to generate the one or more new hypotheses.

Premise

Firstly, the explanation is given about the technology and the definitions serving as the premise of an embodiment.

In the embodiment, a search is performed for a weighted finite state automaton that is an example of a digraph to which input symbols and weights are assigned.

In a WFSA, a transition has an input symbol as well as a weight assigned thereto. A WFSA is configured as an 8-tuple (Q, E, Σ, K, I, F, λ, ρ) including a set Q of states, a set E of transitions, a set Σ of input symbols, a set K of weights, a set I of initial states, a set F of final states, an initial weight function λ, and a final weight function ρ. Moreover, a transition is configured as a 4-tuple (previous state, next state, input symbol, weight).

In the embodiment, to an input symbol for transition, aside from assigning a symbol included in the set Σ of input symbols, it is also possible to assign ε. Herein, ε indicates that the input symbol is empty. Moreover, it is assumed that ε is not included in the set Σ of input symbols. A transition for which the resultant input symbol of transition is ε, that is, a transition for which ε is assigned as the input symbol is called an empty transition or an ε transition in the embodiment.

An input symbol string represents a symbol string in which zero or more input symbols assigned to a WFSA are concatenated. Herein, an input symbol string having zero input symbols indicates an empty symbol string in which not a single symbol is yet concatenated.

In the embodiment, regarding a transition e; the previous state is expressed as p(e), the next state is expressed as n(e), the input symbol is expressed as i(e), and the weight is expressed as w(e). Moreover, in the embodiment, n(E) represents a set of next states of the transitions included in the set E of transitions. Furthermore, in the embodiment, an empty set is expressed as { }. In a pseudo code described later, an empty set is expressed by superimposing "/" on "0". In the embodiment, the number of elements of a set B is expressed as |B|.

A path $\pi_{xy}$ from a state $q_x$ to a state $q_y$ is made of transitions. If the transitions constituting that path are expressed as $e_1, e_2, \ldots, e_n \in E$, then $\pi_{xy} = e_1 e_2 \ldots e_n$ holds true. Herein, $q_x = p(e_1)$, $n(e_i) = p(e_{i+1})$, $n(e_n) = q_y$, $i=1, \ldots, n-1$ holds true.

Examples of the set K of weights include a set of all integers, a set of all real numbers, a set of all complex numbers, a matrix, and a set of Booleans (0 and 1). Besides, the set K of weights can be a set of non-positive real numbers or a set of non-negative real numbers. In the embodiment, corresponding to an initial state $q_i \in I$, the initial weight is expressed as $\lambda(q_i)$. Similarly, corresponding to a final state $q_f \in F$, the final weight is expressed as $\rho(q_f)$. Herein, the initial weight $\lambda(q_i)$ may not be present. Moreover, the final weight $\rho(q_f)$ may not be present. In that case, the operations are performed by assuming an initial state $\lambda(q_i)=1^{\#}$ and a final state $\lambda(q_f)=1^{\#}$. The explanation about $1^{\#}$ is given later.

In the embodiment, the set K of weights satisfies a condition called semiring. More particularly, to be a semiring, the set K needs to satisfy the following four conditions.

First condition: the set K is a commutative monoid with respect to the binary operation (+), and the identity element thereof is $0^{\#}$.

Second condition: the set K is a monoid with respect to the binary operation (×), and the identity element thereof is $1^{\#}$.

Third condition: with respect to an arbitrary x∈K, an arbitrary y∈K, and an arbitrary z∈K; the distributive law holds true. Thus, x (×) (y (+) z)=(x (×) y) (+) (x (×) z) holds true, and (y (+) z) (×) x=(y (×) x) (+) (z (×) x) holds true.

Fourth condition: with respect to an arbitrary x∈K, $0^{\#}$(×) x=x (×) $0^{\#}$=$0^{\#}$ holds true.

Consequently, in the embodiment, arbitrary elements included in the set K can be combined using the binary operations (+) and (×). In the pseudo code (described later), the binary operation (+) is expressed as a symbol in which "+" is enclosed in a circle and the binary operation (×) is expressed as a symbol in which "×" is enclosed in a circle. Meanwhile, in the embodiment, the set K can include constant numbers $0^{\#}$ and $1^{\#}$.

Examples of a semiring include a tropical semiring (or a min-plus semiring). The set K satisfying a tropical semiring is a set in which infinity (∞) is included in addition to a non-negative real number $R_+$; and it is defined that (+) represents min, (×) represents +, $0^{\#}$ represents ∞, and $1^{\#}$ represents 0. Meanwhile, even if the set K is a set in which infinity (∞) is included in addition to a non-negative integer $N_+$, the set K satisfies a tropical semiring. Moreover, there also exists a semiring in which the set K has −∞ included in addition to a non-positive real number $R_-$; and it is defined that (+) represents max, (×) represents +, $0^{\#}$ represents −∞, and $1^{\#}$ represents 0. Similarly, there exists a log semiring in which the (+) calculation of a tropical semiring is replaced with $x(+)y=-\log(e^{-x}+e^{-y})$. Aside from that, various other types of semiring are also present.

Meanwhile, in the embodiment, when all elements included in a set W are combined using the binary operation (+), it is expressed in the form of following expression.

$$\bigoplus_{w \in W} w \quad (1)$$

When the elements included in the set W are expressed as $w_1, w_2, w_3, \ldots, w_{|W|}$; Expression (1) represents the calculation of $w_1(+) w_2(+) w_3(+) \ldots (+) w_{|W|}$.

In the embodiment, a best weight points to the value of the result of performing the operation (+) on the elements of the target weight. If a different type of semiring is used for the same target weight, then the best weight may vary. For example, with respect to a set of weights {1, 2, 3}; when a semiring having (+) as min is used, then the best weight is 1. In contrast, if a semiring having (+) as max is used, then the best weight is 3.

Meanwhile, when an input symbol or a weight has been assigned to the initial state, then a single new initial state is added to the WFSA along with a transition from the new initial state to the original initial state. Then, the input symbol and the weight that have been assigned to the original initial state can be assigned to that transition. As a result, the original initial state is modified to a state that is not the initial state.

Meanwhile, in the embodiment, it is also possible to search paths in a weighted digraph in which weights are assigned to the states. In this case, the digraph to be searched can be converted in advance into a WFSA. More particularly, if w(q) represents the weight of a state q in the digraph to be searched, then the digraph to be searched can be converted into a WFSA in which w(n(e)) represents the weight of a transition e. Alternatively, instead of prior conversion, it is also possible to replace w(e) with w(n(e)).

Moreover, in the embodiment, it is also possible to search paths in a weighted digraph in which input symbols are assigned to the states. In this case too, the digraph to be searched can be converted in advance into a WFSA. More particularly, if i(q) represents the input symbol of a state q in the digraph to be searched, then the digraph to be searched can be converted into a WFSA in which the transition e has an input symbol i(n(e)). Alternatively, instead of prior conversion, it is also possible to replace i(e) with i(n(e)).

Configuration of Search Device 10

Figure 2:
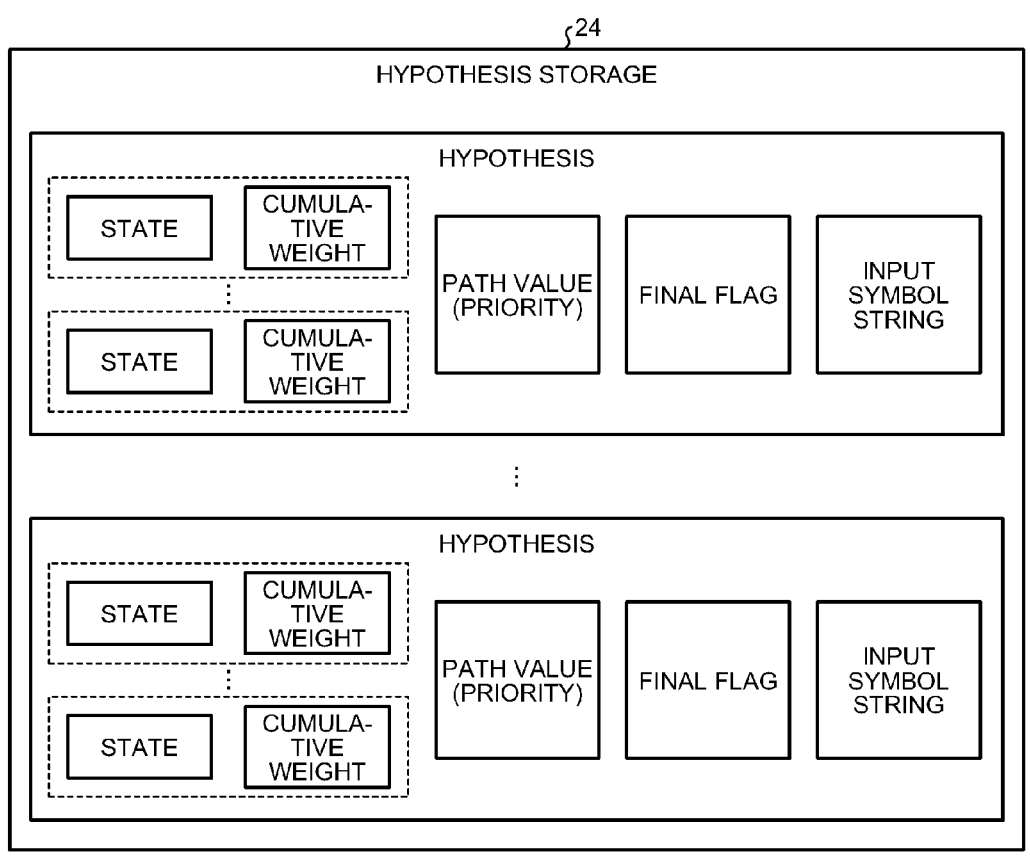
FIG. 2 is a diagram illustrating hypotheses stored in a hypothesis storage.

FIG. 1 is a diagram illustrating a configuration of a search device 10 according to the embodiment. FIG. 2 is a diagram illustrating hypotheses stored in a hypothesis storage 24.

The search device 10 searches paths in a WFSA, which is an example of a digraph in which input symbols and weights have been assigned. The search device 10 finds a predetermined number of (N number of) non-duplicative input symbol strings, in each of which input symbols present in the path from the initial state to a final state are concatenated, in a sequential manner starting from the path having the best cumulative weight. Then, for example, the search device 10 outputs either the N number of input symbol strings or the N-th input symbol string.

The search device 10 includes an obtaining unit 21, a digraph storage 22, a best-path weight storage 23, the hypothesis storage 24, a retriever 25, an output unit 26, and a hypothesis expander 27.

The obtaining unit 21 obtains a WFSA from outside. As an example, the obtaining unit 21 obtains a WFSA from a decoder (described later). Then, the obtaining unit 21 stores the obtained WFSA in the digraph storage 22.

Moreover, for each state included in the WFSA, the obtaining unit 21 stores, in the best-path weight storage 23, the weight of the best path from that state to a final state. As an example, from a decoder that generates the WFSA, the obtaining unit 21 can obtain in advance the weight of the best path for each state included in the WFSA. Alternatively, based on the WFSA stored in the digraph storage 22, the obtaining unit 21 can calculate the weight of the best path for each state included in the WFSA.

For example, the obtaining unit 21 follows the paths in the opposite direction from the final states of the WFSA and calculates the best weights up to all states. More particularly, using the Dijkstra algorithm, the Bellman-Ford algorithm, or the generic single-source shortest distance algorithm; the obtaining unit 21 calculates the best weight from a final state to a state. Meanwhile, if the WFSA does not contain a cyclic path, then the best weight from the final state to a state can be calculated using a distance calculation algorithm that is usable in a directed acyclic graph.

The digraph storage 22 is used to store the WFSA obtained by the obtaining unit 21. Herein, the digraph storage 22 is used to store the WFSA in a constantly-accessible manner from the hypothesis expander 27.

The best-path weight storage 23 is used to store, for each state included in the WFSA, the weight of the best path from that state to a final state. When there is a specification of the state from the hypothesis expander 27, the best-path weight storage 23 returns the weight of the corresponding best path. As an example, in the best-path weight storage 23, each state and the best path weight are stored in a corresponding manner using an associative array. Moreover, if the states are identifiable by numbers, then each state and the best path weight can be stored in a corresponding manner using an array in the best-path weight storage 23.

The hypothesis storage 24 is used to store one or more hypotheses. As illustrated in FIG. 2, a hypothesis represents information that holds a plurality of states, a plurality of cumulative weights, a path value, a final flag, and an input symbol string.

An input symbol string is a string in which input symbols present in the paths obtained by searching the WFSA, which is stored in the digraph storage 22, are concatenated from the initial state up to a particular state. When the search finds a single input symbol, that input symbol gets concatenated at the end. Thus, as the search of the WFSA proceeds, the input symbol string becomes longer. However, if a particular input symbol is empty (s), then that input symbol is not concatenated. Herein, the input symbol string can be expressed in the form of an array or a linked list. Meanwhile, as an alternative to holding the input symbol strings in a hypothesis, the paths corresponding to the input symbol strings can be held in the hypothesis. Then, immediately before the output unit 26 performs the output, the input symbol strings corresponding to the held paths can be output. In this case, it can be said that the paths held in the hypothesis is one form of expressing the input symbol strings.

Each of a plurality of states represents information indicating the state of the head of each path in which it is possible to obtain the input symbol string held by the corresponding hypothesis. That is, each of a plurality of states represents the state of the head of each of one or more paths in which the same input symbol string can be obtained. Thus, the input symbol string held by the hypothesis matches with the input symbol string present in any one of the paths from the initial state to the states held by the hypothesis.

Each of a plurality of cumulative weights is held corresponding to one of a plurality of states on a one-to-one basis. The cumulative weight corresponding to a particular state represents the cumulative weight in the best path which starts from the initial state and ends at that particular state and in which the input symbol string held by the hypothesis can be obtained. Thus, the cumulative weight corresponding to a particular state represents the best weight from among the cumulative weights in one or more such paths which start from the initial state and end at that particular state and in which the input symbol string held by the hypothesis can be obtained.

The path value represents the best value from among the values obtained by accumulating the weights from the initial state to a final state in one or more paths passing through each of one or more held states.

For example, regarding a particular state, the value obtained by adding the cumulative weight corresponding to that state and the weight of the best path from that state to a final state is treated as a total value. In this case, from among the total values of all of one or more states held by the hypothesis, the path value represents the best total value. Meanwhile, regarding each of one or more states held by the hypothesis, the cumulative weight corresponding to that state is held by the hypothesis. Moreover, regarding each of one or more states held by the hypothesis, the weight of the best path from that state to a final state is stored in the best-path weight storage 23.

The final flag indicates whether or not the corresponding hypothesis is a final hypothesis in which the search of the paths is over till a final state. More particularly, when one or more states held by the corresponding hypothesis are all final states, then the final flag is set to true. However, if any one of one or more states held by the corresponding hypothesis is not a final state, then the final flag is set to false.

The hypothesis storage 24 is used to store an initial hypothesis at the starting stage of the search. The initial hypothesis holds therein an empty input symbol string; one or more initial states (states) included in the WFSA; the initial weight (the cumulative weight) corresponding to each of one or more initial states; the best value (the path value) from among the weight of the best path corresponding to each of one or more initial states; and a final flag (set to false) indicating that the search up to the final state is not yet over. As the search proceeds, the hypothesis stored in the hypothesis storage 24 is branched according to the branching of the paths of the WFSA. Thus, as the search proceeds, the number of hypotheses to be stored in the hypothesis storage 24 increases.

The retriever 25 retrieves one hypothesis from the hypothesis storage 24 as the target hypothesis, and sends the target hypothesis to the output unit 26 and the hypothesis expander 27. In this case, of one or more hypotheses stored in the hypothesis storage 24, the retriever 25 retrieves one hypothesis as the target hypothesis that holds the input symbol string which corresponds to such an already-searched path for which the result of adding the weight of the already-searched path corresponding to each hypothesis and the weight of the best path from the starting state of that path up to a final state is the best weight. That is, the hypothesis storage 24 retrieves the hypothesis having the best path value as the target hypothesis. Moreover, the retriever 25 deletes the retrieved hypothesis from the hypothesis storage 24.

Thus, the retriever 25 operates the hypothesis storage 24 with a priority queue in which the path value is set as the priority. For example, the priority queue is implemented by storing the hypotheses using a heap, an associative array, an array, a binary tree, or a list.

If the retrieved hypothesis is not a final hypothesis; then, in response to the writing of a new hypothesis by the hypothesis expander 27 in the hypothesis storage 24, the retriever 25 retrieves a next single hypothesis as the target hypothesis and sends it to the output unit 26 and the hypothesis expander 27. On the other hand, if the retrieved hypothesis is a final hypothesis, then the retriever 25 immediately retrieves a next single hypothesis as the target hypothesis and sends it to the output unit 26 and the hypothesis expander 27. Until the N number of final hypotheses are retrieved, the retriever 25 repeatedly retrieves the target hypothesis from the hypothesis storage 24.

Subject to the condition that the target hypothesis retrieved by the retriever 25 is a final hypothesis (more particularly, subject to the condition that the final flag of the target hypothesis is set to true), the output unit 26 outputs the input symbol string held by the target hypothesis. However, when the target hypothesis is not a final hypothesis, the output unit 26 does not perform any operations.

Meanwhile, the output unit 26 can store the input symbol strings until the N number of input symbol strings are obtained, that is, until the N number of hypotheses are retrieved. Once the N number of input symbol strings are obtained, the output unit 26 can collectively output the N number of input symbol strings. Alternatively, without outputting the input symbol strings until the N number of input symbol strings are obtained; after the N number of input symbol strings are obtained, the output unit 26 can output only the N-th input symbol string. Still alternatively, when a final hypothesis is retrieved, the output unit 26 can immediately output a single input symbol string.

When the target hypothesis retrieved by the retriever 25 is not a final hypothesis (more particularly, when the final flag of the target hypothesis is set to false), the hypothesis expander 27 generates, from one or more states held by the target hypothesis, one or more new hypotheses that hold the input symbol strings present in the paths in which the search has been performed until finding a single input symbol. Then, the hypothesis expander 27 writes the one or more newly-generated hypotheses in the hypothesis storage 24.

In this case, if the outgoing transitions from each of one or more states held by the target hypothesis include an empty transition; then the hypothesis expander 27 follows the empty transition from that state, adds the reached state to the target hypothesis, continues with the search, and generates one or more new hypotheses. Meanwhile, if the target hypothesis is a final hypothesis, then the hypothesis expander 27 does not perform any operations.

Meanwhile, the hypothesis expander 27 includes an empty transition processor 31, a final generator 32, and a hypothesis generator 33.

When the outgoing transitions from each of one or more states held by the target hypothesis include an empty transition, the empty transition processor 31 follows the empty transition from that state and adds the reached state to the target hypothesis. Moreover, when a state is reached after following two or more empty transitions from a state held by the target hypothesis, the empty transition processor 31 also adds, to the target hypothesis, the state that is reached by following two or more empty transitions.

Meanwhile, regarding a state reached by following an empty transaction, if all outgoing transitions from that state are empty transitions and if that state is not a final state, then the empty transition processor 31 may not add that state in the target hypothesis. That is, in this case, of the states reached by following the empty transitions from the states held by the target hypothesis, the empty transition processor 31 adds, to the target hypothesis, the final states and the states having at least one outgoing transition other than the empty transition.

In a corresponding manner to an added state, the empty transition processor 31 also adds the cumulative weight to the target hypothesis. More particularly, the empty transition processor 31 adds, to the target hypothesis as the corresponding cumulating weight thereof, a value obtained by adding the cumulative weights corresponding to the states held by the target hypothesis and the cumulative weight of the best path from among one or more paths reached by following empty transitions from the states held by the target hypothesis.

After the empty transition processor 31 performs operations, if one or more states held by the target hypothesis include a final state, then the final generator 32 generates a final hypothesis. More particularly, the final generator 32 generates, as a final hypothesis, a new hypothesis that holds the input symbol string held by the target hypothesis; the final state from among one or more states held by the target hypothesis; the path value held by the target hypothesis; and a final flag (set to true) indicating that the search up to the final state has been completed. Then, the final generator 32 writes the final hypothesis in the hypothesis storage 24.

After the empty transition processor 31 performs operations, the hypothesis generator 33 generates a new hypothesis that holds an input symbol string in which a new single input symbol, which is obtained by following the outgoing transitions from one or more states held by the target hypothesis, is concatenated at the end of the input symbol string held by the target hypothesis.

In this case, the hypothesis generator 33 makes the newly-generated hypothesis hold one or more states reached by following the transitions having new input symbols assigned thereto from each of one or more states held by the target hypothesis. Moreover, the hypothesis generator 33 calculates a path value and makes the newly-generated hypothesis hold the path value. Furthermore, the hypothesis generator 33 makes the newly-generated hypothesis hold the final flag (set to false) indicating a non-final state.

Moreover, when a plurality of transitions having different input symbols assigned thereto is outgoing from one or more states held by the target hypothesis, the hypothesis generator 33 branches the target hypothesis and generates a plurality of new hypotheses equal in number to the number of input symbols. Then, the hypothesis generator 33 writes the newly-generated hypotheses in the hypothesis storage 24.

Process Flow

FIG. 3 is a diagram illustrating a process flow performed by the search device 10 according to the embodiment. Given below is the explanation of the sequence of processes performed in the search device 10.

Firstly, the search device 10 obtains a WFSA (Step S101). However, if a WFSA has already been obtained, the search device 10 may not perform the process at Step S101.

Then, for each state included in the WFSA, the search device 10 obtains the weight of the best path from that state up to a final state (Step S102). Herein, the search device 10 can obtain corresponding values from a decoder that generated the WFSA. Alternatively, the search device can refer to the WFSA and calculate the corresponding values. Meanwhile, if the corresponding values have already been obtained, the search device 10 may not perform the process at Step S102.

Subsequently, while accessing the WFSA and the weight of the best path, the search device 10 searches the WFSA to find out the N-th best input symbol string (Step S103). That is, the hypothesis expander 27 finds out N number of non-duplicative input symbol strings, which are present in the paths from the initial state to the final states, in a sequential manner starting from the path having the best cumulative weight.

In this case, the search device 10 finds out the input symbol strings by repeatedly performing the processes of retrieving a single hypothesis having the highest priority (i.e., having the best path value held therein) from the priority queue (the hypothesis storage 24), branching the retrieved hypothesis, and again writing the branched hypotheses in the priority queue (the hypothesis storage 24).

Then, the output unit 26 outputs the N number of input symbol strings that are found (Step S104). Herein, the output unit 26 can collectively output the N number of input symbol strings. Alternatively, every time the input symbol string of the best path is found, the output unit 26 can output a single input symbol string. Still alternatively, the output unit 26 may output only the N-th input symbol string.

Pseudo Code

FIG. 4 is a diagram illustrating a pseudo code for the operations performed by the search device 10 according to the embodiment. Explained below with reference to the pseudo code is an example of the detailed operations performed by the search device 10 at Step S103.

In the pseudo code, the weight of the best path from the state q to a final state can be obtained using a function $w_{pred}(q)$. Moreover, in the pseudo code, R represents the set of input symbol strings to be output. Furthermore, in the pseudo code, N represents the number of input symbol strings that should be output. For N=3, the search device 10 outputs the input symbol string present in the best path, outputs the input symbol string present in the second best path, and outputs the input symbol string present in the third best path.

Meanwhile, in this example, the path to be searched starts at the initial state and ends at a final state. In the case of a path starting at a different state than the initial state and ending at a different state than the end state, the WFSA can be modified in advance in such a way that the state at the start serves as the initial state and the state at the end serves as a final state. Moreover, if the search is to be performed in the reverse direction; the direction of transitions in the WFSA can be reversed, and the initial state and the final state can be interchanged.

Meanwhile, in the WFSA given in this example, the set of weights satisfies a tropical semiring. In the case of a tropical semiring, it is more suitable to have smaller weights.

In the pseudo code, S represents the priority queue in which one or more hypotheses are stored. Moreover, in the pseudo code, a hypothesis is represented as a 4-tuple (s, path value, final flag (f), input symbol string (r)). Herein, "s" represents the set of pairs of the state q and the corresponding cumulative weight w. In this example, the set of weights satisfies a tropical semiring. Hence, upon receiving a hypothesis retrieval request, the hypothesis having the smallest path value is output from the priority queue S as the hypothesis having the highest priority. As a result of using the priority queue S, the search device 10 can implement the hypothesis storage 24 that is used in storing one or more hypotheses each of which represents information that holds the input symbol strings, which are obtained by searching the paths of a digraph from the initial state, and the starting state of each of one or more paths in which the input symbol strings can be obtained.

Firstly, at the first line, the search device 10 substitutes the set of pairs of the initial state and the initial weight in the set s.

At the second line, the search device 10 generates a hypothesis in the form of a 4-tuple given below and adds the hypothesis to the priority queue S.

The first element of the hypothesis is the set s generated at the first line. The second element of the hypothesis is the result of calculating all $w (\times) w_{pred}(q)$ regarding each pair of the state q and the cumulative weight w included in the set s and then combining those values with (+). In this example, since (+) represents min, the second element becomes the smallest value from among the values of $w+w_{pred}(q)$. The third element represents "false". That is, regarding this hypothesis, it is indicated that the search has not completed till a final state, and will still be carried on. The fourth element is ε. At the starting stage of the search, no transition is made and no input symbol is present that should be concatenated to the input symbol string. Hence, the input symbol string becomes ε.

The third line indicates that, while the priority queue S is not an empty set, the operations from the fourth line to the 17-th line are performed in a repeated manner. However, when the priority queue S becomes an empty set, the search device 10 proceeds to the operation at the 18-th line. When the priority queue S is not an empty set, the search device 10 performs the operations starting from the fourth line.

At the fourth line, from among the hypotheses included in the priority queue S, the search device 10 retrieves the hypothesis having the highest priority as the target hypothesis. In this example, from the priority queue S, the search device 10 retrieves the hypothesis which has the path value as the second element thereof to be the smallest. In the operations from the fourth line onward, the second element (the path value) is not used. Thus, at the fourth line of the pseudo code, the value of the second element of the retrieved target hypothesis is illustrated to be "•" thereby indicating that no value is assigned to the second element. As a result of executing the fourth line, of one or more hypotheses stored in the hypothesis storage 24, the search device 10 can retrieve, as the target hypothesis, one hypothesis that holds the input symbol string obtained from the path likely to have the best cumulative weight up to a final state.

At the fifth line, the search device 10 determines whether or not the final flag, which is the third element of the retrieved target hypothesis, is set to true. That is, the search device 10 determines whether or not the target hypothesis is a final hypothesis. If the final flag f is set to true, then the search device 10 performs the operations from the sixth line to the eighth line. However, if the final flag f is not set to true, then the search device 10 performs the operations from the 10-th line to the 17-th line.

At the sixth line, the search device 10 adds the found result in the set R. Herein, R represents the set of pairs of two elements. Of a pair of two elements, the first element represents the order of the obtained input symbol strings r. The result found at the beginning, that is, the input symbol string having the best cumulative weight of the corresponding path is first in the order. The second element represents the input symbol string r that is obtained. As a result of executing the sixth line, subject to the condition that the retrieved target hypothesis is a final hypothesis in which the search has completed up to a final state, the search device 10 can output the input symbol string held by the target hypothesis.

At the seventh line, the search device 10 determines whether or not the number of elements included in the set R has become equal to the number N of the input symbol strings to be obtained. That is, the search device 10 determines whether or not the obtained results are equal in number to the number N of the input symbol strings to be obtained. If the N number of results are not yet obtained, then the search device 10 returns to the operation at the third line. When the N number of results are obtained, the search device 10 performs the operation at the eighth line and returns the set R as the processing result of the pseudo code. That marks the end of the operations of the pseudo code. As a result of executing the seventh line and the eighth line, the search device 10 can repeatedly retrieve the target hypothesis from the hypothesis storage 24 until the predetermined number of (N number of) final hypotheses are retrieved.

At the 10-th line, the search device 10 calls a function eps_shortest (details given later). Herein, "s" serves as the argument of the function eps_shortest. When the outgoing transitions from each state included in the set s include an ε transition; the function eps_shortest adds, to the set s, the new state q reached by following the ε transition from that state. Moreover, when the new state q is added to the set s, the function eps_shortest also adds the cumulative weight w corresponding to the added state q. The processing result of the function eps_shortest is returned by substitution thereof in "s".

As a result of executing the function eps_shortest, if the outgoing transitions from each of one or more states held by the target hypothesis include an empty transition, then the search device 10 can add to the target hypothesis the state reached by following the empty transition from that state. Moreover, the search device 10 can add, to the target hypothesis as the corresponding cumulative weight thereof, the value obtained by adding the cumulative weight corresponding to the states held by the target hypothesis and the cumulative weight of the best path from among one or more paths reached by following empty transitions from the states held by the target hypothesis.

At the 11-th line, when the first element of a pair of two elements, which serve as the elements of the set s, has a final state included therein, the search device 10 substitutes the cumulative weight corresponding to that final state into a set $s_f$ made of the pair of two elements.

At the 12-th line, the search device 10 determines whether or not the set $s_f$ is an empty set. If the set $s_f$ is an empty set, then the search device 10 proceeds to the operation at the 14-th line. On the other hand, if the set $s_f$ is not an empty set, then the search device 10 proceeds to the operation at the 13-th line.

At the 13-th line, the search device 10 generates a final hypothesis in the form of a 4-tuple given below and adds the final hypothesis to the priority queue S.

The first element of the final hypothesis is $s_f$ generated at the 11-th line. The second element of the final hypothesis is the result of calculating all w (×) ρ(q) regarding each pair of the state q and the cumulative weight w included in the set s, and combining those values with (+). In this example, since (+) represents min, the second element becomes the smallest value from among the values of w+ρ(q). The third element represents "true". That is, regarding this hypothesis, it is indicated that the search has completed till the final state. The fourth element is the input symbol string r held by the target hypothesis which is retrieved from the priority queue S at the fourth line.

As a result of executing the 13-th line, when one or more states held by the target hypothesis include a final state, the search device 10 can generate, as the final hypothesis, a new hypothesis that holds the input symbol string held by the target hypothesis and the final state from among one or more states held by the target hypothesis; and can write the new hypothesis in the hypothesis storage 24. After completing the operation at the 13-th line, the search device 10 proceeds to the operation at the 14-th line.

At the 14-th line, it is indicated that the operations from the 15-th line to the 17-th line are performed with respect to all input symbols included in the set Σ of input symbols. Meanwhile, as substitute for the set Σ of input symbols, it is also possible to use the set of input symbols that, from among the input symbols assigned to each outgoing transition from each state included in the set s, are included in the set Σ of input symbols. In other words, it is possible to use the set of input symbols except ε that are assigned to each outgoing transition from each state included in the set s. In this case, the search device 10 may not perform the operation at the 16-th line.

At the 15-th line, when "a" represents the input symbol to be processed, the search device 10 performs the following operations with respect to the 2-tuple (q, w) included in the set s.

Firstly, when "e" represents the transition that, from among the outgoing transitions from the state q, is assigned with the input symbol a; the search device 10 generates a 2-tuple in which the first element represents the next state of the transition e and the second element represents w (×) w(e).

In this example, since the set of weights satisfies a tropical semiring, the second element in the form of w (×) w(e) becomes equal to the value obtained by adding the weight w and the weight of the transition e. Herein, $s_a$ represents the set of pairs of the two elements obtained in the abovementioned manner.

At the 16-th line, the search device 10 determines whether or not the set $s_a$ is an empty set. If the set $s_a$ is not an empty set, then the search device 10 performs the operation at the 17-th line.

At the 17-th line, the search device 10 generates a new hypothesis in the form of a 4-tuple given below and adds the new hypothesis to the priority queue S.

The first element of the hypothesis is the set s, generated at the 15-th line. The second element of the hypothesis is the result of calculating all w ($\times$) $w_{pred}$(q) regarding each pair of the state q and the cumulative weight w included in the set $s_a$ and combining those values with (+). The third element represents false. That is, regarding this hypothesis, it is indicated that the search has not completed till a final state, and will still be carried on. The fourth element is a symbol string in which the input symbol a is concatenated at the end of the input symbol string r held by the target hypothesis that is retrieved from the priority queue S at the fourth line.

As a result of executing the 17-th line, the search device 10 can generate one or more new hypotheses each of which holds an input symbol string that is formed when a new input symbol is concatenated at the end of the input symbol string held by the target hypothesis and which holds one or more states reached by following the transition assigned with the new input symbol from each of one or more states held by the target hypothesis; and can write the new hypotheses in the hypothesis storage 24. The search device repeatedly performs the operations from the 15-th line to the 17-th line for all input symbols. Once the operations are performed for all input symbols, the search device 10 returns to the operation at the third line.

At the 18-th line, the search device 10 returns the set R of input symbol strings that is obtained as the result, and ends the operations of the pseudo code. Meanwhile, if the priority queue S is an empty set at the third line, then the search device 10 performs the operation at the 18-th line. If the operations of the pseudo code are ended at the 18-th line, it indicates that N number of candidates were not present in the WFSA.

In this pseudo code, the results from the first result to the N-th result are returned. However, if only the N-th best result is required, then the search device 10 can return, as the result, only those pairs of two elements in which the first value is equal to N from among the pairs of two elements included in the set R of input symbol strings.

FIG. 5 is a diagram illustrating a pseudo code for the operations of the function eps_shortest(s). Thus, given below is the detailed explanation of the function eps_shortest.

In this example, the function eps_shortest makes the search device 10 perform operations based on the Dijkstra algorithm. However, alternatively, the function eps_shortest can make the search device 10 perform operations based on the Bellman-Ford algorithm or the generic single-source shortest distance algorithm. Meanwhile, if the WFSA does not contain a cyclic path, then the function eps_shortest can make the search device 10 perform operations based on a distance calculation algorithm that is usable only in a directed acyclic graph.

In the function eps_shortest, a single weight can be assigned to each state. The weight assigned to the state q is expressed as $w_\varepsilon[q]$.

At the first and second lines, for each state q, the search device 10 initializes the weight $w_\varepsilon[q]$ with $0^\#$. When the set of weights satisfies a tropical semiring, the search device 10 initializes the weights $w_\varepsilon[q]$ with $\infty$. As an example, the search device 10 initializes the weights $w_\varepsilon[q]$ with the maximum value of the weights. In this example, the search device 10 performs the initialization for all states q included in the set Q. However, alternatively, the search device 10 can perform the initialization for those states which can be reached by following only the $\varepsilon$ transitions from the states included in the set s.

At the third line, the search device 10 initializes a set $Q_r$, which is the set of states output as the result, with an empty set.

At the fourth line, it is indicated that the search device 10 performs the operations at the fifth and sixth lines with respect to the 2-tuple (q, w) included in the set s. At the fifth line, the search device 10 substitutes the weight w in the weight $w_\varepsilon[q]$. At the sixth line, the search device 10 adds the state q in a priority queue $\psi$. In the priority queue $\psi$, identical states are not written in a duplicative manner. The priorities in the priority queue $\psi$ represent the values of the weights $w_\varepsilon[q]$. When the set of weights satisfies a tropical semiring; smaller the weight $w_\varepsilon[q]$, higher becomes the priority of the state q. Every time the function eps_shortest is called, the priority queue $\psi$ is initialized with an empty set. As an example, the priority queue $\psi$ is initialized at the third line.

At the seventh line, it is indicated that, while the priority queue $\psi$ is not empty, the operations from the eighth line to the 15-th line are performed in a repeated manner. If the priority queue $\psi$ is empty, then the search device 10 proceeds to the operation at the 16-th line. If the priority queue $\psi$ is not empty, the search device 10 proceeds to the operation at the eighth line.

At the eighth line, of the states included in the priority queue $\psi$, the search device retrieves the state having the highest priority and substitutes the retrieved state in the state q.

At the ninth line, if the state q is a final state or if the outgoing transitions from the state q include one or more transitions not having the input symbol $\varepsilon$, then the search device 10 proceeds to the operation at the 10-th line. However, if the state q is not a final state and if all outgoing transitions from the state q have the input symbol $\varepsilon$, then the search device 10 proceeds to the operation at the 11-th line without performing the operation at the 10-th line.

Herein, the determination operation at the ninth line can be skipped, and the search device 10 can be configured to always perform the operation at the 10-th line. Even if the operation at the 10-th line is always performed, the state that should be eliminated during the determination operation at the ninth line is anyway not processed at the 15-th line illustrated in FIG. 4. Thus, in either case, the same result is obtained. However, if the determination operation at the ninth line is performed, then the number of elements included in the set returned at the 16-th line becomes equal to or smaller than the number of elements in the case of not performing the determination operation. Hence, it becomes possible to reduce the amount of processing in the pseudo code illustrated in FIG. 4.

At the 10-th line, the search device 10 adds the state q to the set $Q_r$.

At the 11-th line, it is indicated that the operations from the 12-th line to the 15-th line are performed with respect to the transition e having the input symbol $\varepsilon$ from among the outgoing transitions from the state q.

At the 12-th line, the search device 10 performs a ($\times$) operation with respect to the weight $w_\varepsilon[q]$ and the weight w(e), and substitutes the result in the cumulative weight w.

At the 13-th line, it is indicated that, if the result of a (+) operation with respect to the cumulative weight w and a weight $w_\varepsilon[n(e)]$ does not match with the weight $w_\varepsilon[n(e)]$, then the operations at the 14-th line and the 15-th line are performed. When the set of weights satisfies a tropical semiring, the (+) operation returns the smallest value. Hence, if the cumulative weight w is smaller than the weight $w_\varepsilon[n(e)]$, then the search device 10 performs the operations at the 14-th line and the 15-th line.

At the 14-th line, the search device 10 substitutes the cumulative weight w in the weight $w_\varepsilon[n(e)]$. At the 15-th line, the search device 10 adds n(e), that is, the next state of the transition e to the priority queue ψ.

At the 16-th line, the search device 10 returns, as the result, the set of pairs of each state q included in the set $Q_r$ and the weight $w_\varepsilon[q]$ assigned to that state.

As a result of executing the function eps_shortest, when the outgoing transitions from each of one or more states held by the target hypothesis include an empty transition, the search device 10 can add, to the target hypothesis, the state reached by following the empty transition from that state. Moreover, the search device 10 can add, to the target hypothesis as the corresponding cumulative weight thereof, the value obtained by adding the cumulative weight corresponding to the states held by the target hypothesis and the cumulative weight of the best path from among one or more paths reached by following empty transitions from the states held by the target hypothesis.

Specific Example of Processes

Figure 6:
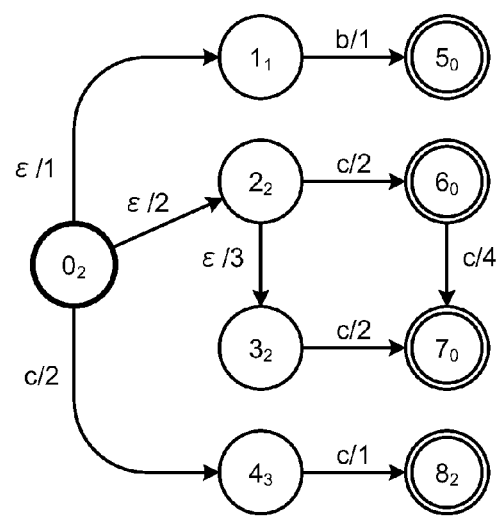
FIG. 6 is a diagram illustrating an example of a WFSA.

FIG. 6 is a diagram illustrating an example of the WFSA. Explained below with reference to the WFSA illustrated in FIG. 6 is the manner in which the search device 10 outputs input symbol strings from the best input symbol string to the N-th best input symbol string.

In the WFSA illustrated in FIG. 6, the set of weights satisfies a tropical semiring. With reference to FIG. 6, circles represent states; the circle illustrated with a heavy line represents the initial state; double circles represent the final states; and arrows represent transitions. Furthermore, with reference to FIG. 6, regarding the characters written near the arrows, the characters on the left-hand side of "/" indicate the input symbols and the characters on the right-hand side of "/" indicate the weights.

Moreover, with reference to FIG. 6, the numbers written inside the circles represent state numbers, and the subscript numbers written on the lower right side of the state numbers represent the weights of the best paths from the respective states to a final state. Meanwhile, in the WFSA illustrated in FIG. 6, the initial weight is equal to zero.

Firstly, in the WFSA illustrated in FIG. 6, final states 5, 6, and 7 have the final weight equal to zero; and a final state 8 has the final weight equal to two. Thus, as far as the values assigned as the weights of the best paths to the final states; the final states 5, 6, and 7 have the value zero assigned thereto. Regarding the final state 8, since there is no outgoing transition from that state, the final weight becomes the weight of the best path. That is, the cumulative weight assigned to the state 8 is equal to two. Meanwhile, in this example, N=3.

Firstly, at Step S101 illustrated in FIG. 3, the search device 10 stores the WFSA illustrated in FIG. 6 in the digraph storage 22. Moreover, at Step S102 illustrated in FIG. 3, with respect to each state included in the WFSA, the search device 10 assigns the weight of the best path from a final state. As a result, the following holds true: $w_{pred}(0)=2$, $w_{pred}(1)=1$, $w_{pred}(2)=2$, $w_{pred}(3)=2$, $w_{pred}(4)=3$, $w_{pred}(5)=0$, $w_{pred}(6)=0$, $w_{pred}(7)=0$, and $w_{pred}(8)=2$.

Then, at Step S103 illustrated in FIG. 3, the search device 10 performs the operations according to the pseudo code illustrated in FIG. 4. Given below is the explanation of the operations performed according to the pseudo code.

Firstly, at the first line, the set s becomes equal to {(0, 0)}. At the second line, a hypothesis in the form of a 4-tuple ({(0, 0)}, 2, false, e}) is added to the priority queue S. The second element of the hypothesis is calculated as $w(\times)w_{pred}(0)=w+w_{pred}(0)=0+2=2$.

At the third line, since the priority queue S is not an empty set, the operation at the fourth line is performed. At the fourth line, a hypothesis is retrieved from the priority queue S. The values retrieved at the fourth line are s={(0, 0)}, f=false, and r=ε. Since the final flag f is set to false, the operation at the 10-th line is performed and the eps_shortest (0) function is executed.

In the processing of the eps_shortest(0) function, firstly, initialization of variables is performed from the first line to the third line. When the operations from the fourth line to the sixth line are completed, $w_\varepsilon[0]=0$, ψ={0} holds true. At the eighth line, q=0, ψ={ } holds true. Since the state 0 satisfies the condition at the ninth line, $Q_r=\{0\}$ holds true at the 10-th line. Regarding the transition from the state 0 to the state 1, the operations from the 12-th line to the 15-th line are performed. At the 12-th line, w=1 holds true. At the 13-th line, the left-hand side is $w (+) w_\varepsilon[1]=1(+)\infty=\min(1, \infty)=1$, and the right-hand side is ∞. Thus, at the 14-th line, $w_\varepsilon[n(e)]=w_\varepsilon[1]=1$ holds true. At the 15-th line, ψ={1} holds true. In an identical manner, regarding the transition from the state 0 to the state 2, the operations from the 12-th line to the 15-th line are performed. As a result, $w_\varepsilon[2]=2$, w={1, 2} holds true.

Since the priority queue ψ is not an empty set, the system control returns to the eighth line illustrated in FIG. 5 and a single state is retrieved from the priority queue ψ. As compared to the weight $w_\varepsilon[2]$, the weight $w_\varepsilon[1]$ is smaller. Hence, the priority of the state 1 becomes higher. Thus, firstly, the state 1 is retrieved. In the state 1, since there are outgoing transitions other than an ε transition, $Q_r=\{0, 1\}$ holds true. Since an ε transition is not present in the outgoing transitions from the state 1, the operations from the 12-th line to the 15-th line are not performed with respect to the state 1.

Subsequently, since the priority queue ψ is not an empty set, the system control returns to the eighth line illustrated in FIG. 5 and the state 2 is retrieved from the priority queue ψ. Since the state 2 satisfies the condition at the ninth line, $Q_r=\{0, 1, 2\}$ holds true at the 10-th line. Since there are outgoing transitions from the state 2, the operations from the 12-th line to the 15-th line are performed. As a result, $w_\varepsilon[3]=5$, ψ={3} holds true. Since the priority queue ψ is not an empty set, the system control returns to the eighth line and the state 3 is retrieved. Since the state 3 satisfies the condition at the ninth line, $Q_r=\{0, 1, 2, 3\}$ holds true at the 10-th line. Since the state 3 does not have an outgoing ε transition, the operations from the 12-th line to the 15-th line are not performed, and the result is returned at the 16-th line.

At the 10-th line illustrated in FIG. 4, the result of the eps_shortest(0) function is substituted in the set s. As a result, s={(0, 0), (1, 1), (2, 2), (3, 5)} holds true. Since there is no final state among the states included in the set s, $s_f=\{\ \}$.

Then, with respect to the input symbols b and c, the operations from the 15-th line to the 17-th line are performed. Firstly, in the case of a=b, $s_a=\{(5, 2)\}$ holds true at the 15-th line. The only state in which the outgoing transition having the input symbol b is present is the state 1. Since the cumulative weight corresponding to the state 1 is 1, the addition of the weight of the transition from the state 1 to the state 5 and the cumulative weight results in a weight 1+1=2. Since the set $s_a$ is not an empty set, S={({(5,2)}, 2, false, b)} holds true at the 17-th line. In the case in which a=c holds true, when the operations from the 15-th line to the 17-th line are performed, $s_a=\{(4, 2), (6, 4), (7, 7)\}$ holds true, and $S=\{(\{(5, 2)\}, 2, \text{false}, b), (\{(4, 2), (6, 4), (7, 7)\}, 4, \text{false}, c)\}$ holds true. The second element of the newly-added hypothesis is calculated as $$(2(\times)w_{pred}(4))(+)(4(\times)w_{pred}(6))(+)(7(\times)w_{pred}(7))=(2+3)(+)(4+0)(+)(7+0)=\min(\min(5,4),7)=4.$$

Since the priority queue S is not an empty set, the system control returns to the fourth line. At the fourth line, the hypothesis having a high priority, that is, the hypothesis having a small second element is retrieved from priority queue S. The value retrieved at the fourth line is $s=\{(5, 2)\}$, f=false, r=b. At the 10-th line, the set s does not change. At the 11-th line, the set $s_f=\{(5, 3)\}$ holds true. Since the set $s_f$ is not an empty set, the operation at the 13-th line is performed and $S=\{(\{(5, 2)\}, 2, \text{true}, b), (\{(4, 2), (6, 4), (7, 7)\}, 4, \text{false}, c)\}$ holds true. Since the state 5 does not have an outgoing transition; even if the operations from the 14-th line to the 17-th line are performed, no result is obtained.

Subsequently, since the priority queue S is not an empty set, the system control returns to the fourth line. Then, $s=\{(5, 2)\}$, f=true, r=b becomes the result retrieved from the priority queue S. At the sixth line, $R=\{(1, b)\}$ holds true. Since N=3, the condition at the seventh line is not satisfied.

Subsequently, since the priority queue S is not an empty set, the system control returns to the fourth line. Then, $s=\{(4, 2), (6, 4), (7, 7)\}$, f=false, r=c becomes the result retrieved from the priority queue S. Since the outgoing transitions from the states 4, 6, and 7 do not include an ε transition; even if the operation at the 10-th line is performed, there is no change in the set s. At the 11-th line, $s_f=\{(6, 4), (7, 7)\}$ holds true.

Since the condition at the 12-th line is satisfied; at the 13-th line, $S=\{(\{(6, 4), (7, 7)\}, 4, \text{true}, c)\}$ holds true. When the operations from the 14-th line to the 17-th line are performed, $S=\{(\{(6, 4), (7, 7)\}, 4, \text{true}, c), (\{(7, 8), (8, 3)\}, 5, \text{false}, cc)\}$ holds true.

Subsequently, since the priority queue S is not an empty set, the system control returns to the fourth line. Then, $s=\{(6, 4), (7, 7)\}$, f=true, r=c becomes the result retrieved from the priority queue S. At the sixth line, $R=\{(1, b), (2, c)\}$ holds true.

Subsequently, since the priority queue S is not an empty set, the system control returns to the fourth line. Then, $s=\{(7, 8), (8, 3)\}$, f=false, r=cc becomes the result retrieved from the priority queue S. Since the state 7 and the state 8 do not have any outgoing transition, there is no change in the set s due to the operation at the 10-th line. At the 13-th line, $S=\{(\{(7, 8), (8, 5)\}, 5, \text{true}, cc)\}$ holds true. Since the state 7 and the state 8 do not have any outgoing transition; even if the operations from the 14-th line to the 17-th line are performed, no result is obtained.

Subsequently, since the priority queue S is not an empty set, the system control returns to the fourth line. Then, $s=\{(7, 8), (8, 5)\}$, f=true, r=cc becomes the result retrieved from the priority queue S. At the sixth line, $R=\{(1, b), (2, c), (3, cc)\}$ holds true. Since $|R|=3$, the condition at the seventh line is satisfied and the result is returned at the eighth line.

Lastly, the result is output at Step S104 illustrated in FIG. 3. Herein, the search device 10 can display the processing result on a screen or send the processing result to the device disposed at the subsequent stage.

Hardware Configuration

Figure 7:
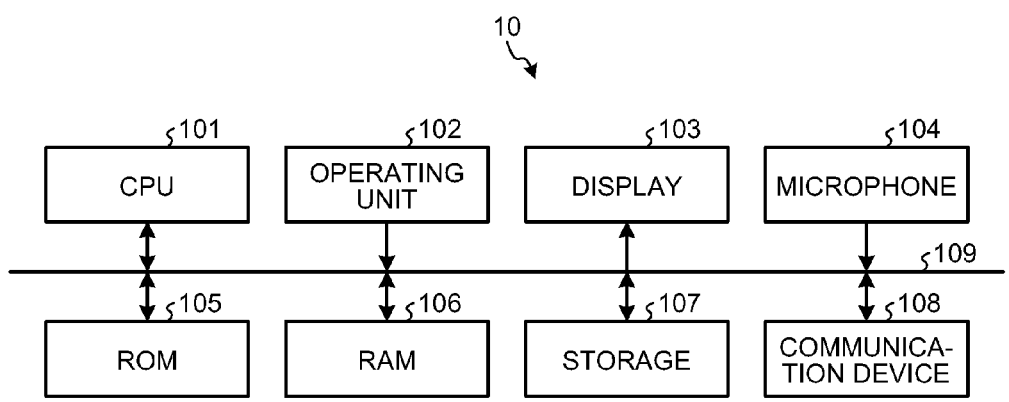
FIG. 7 is a diagram illustrating a hardware configuration of the search device according to the embodiment.

FIG. 7 is a hardware block diagram of the search device 10 according to the embodiment. The search device 10 includes a central processing unit (CPU) 101, an operating unit 102, a display 103, a microphone 104, a read only memory (ROM) 105, a random access memory (RAM) 106, a storage 107, a communication device 108, and a bus 109 that interconnects each of these constituent elements.

The CPU 101 uses a predetermined area in the RAM 106 as the work area and performs various processes in cooperation with various computer programs stored in advance in the ROM 105 or the storage 107; and performs an overall control of the constituent elements of the search device 10. Moreover, in cooperation with the computer programs stored in advance in the ROM 105 or the storage 107, the CPU 101 implements the operating unit 102, the display 103, the microphone 104, and the communication device 108.

The operating unit 102 is an input device such as a mouse or a keyboard that receives instruction signals in the form of information input by a user by operating the operating unit 102, and outputs the instruction signals to the CPU 101.

The display 103 is a display device such as a liquid crystal display (LCD). Based on display signals received from the CPU 101, the display 103 displays a variety of information. For example, the display 103 displays the input symbol strings output by the search device 10. In the case in which the input symbol strings are to be output to the communication device 108 or the storage 107, the search device 10 may not include the display 103. The microphone 104 is a device that receives input of audio signals. In the case in which the WFSA to be processed by the search device 10 is either recorded in the storage 107 or input from a communication device, the search device 10 may not include the microphone 104.

The ROM 105 is used to store, in a non-rewritable manner, computer programs and a variety of setting information to be used in controlling the search device 10. The RAM 106 is a volatile memory medium such as a synchronous dynamic random access memory (SDRAM). The RAM 106 serves as the work area of the CPU 101. More particularly, the RAM 106 functions as a buffer for temporarily storing various variables and parameters used by the search device 10.

The storage 107 is a rewritable recording device such as a storage made of a semiconductor such as a flash memory, or a storage medium capable of magnetic or optical recording. The storage 107 is used to store the computer programs and a variety of setting information used in controlling the search device 10. Moreover, the storage 107 is used to store a variety of WFSA-related information and the input symbol strings to be output. Meanwhile, the digraph storage 22, the best-path weight storage 23, as well as the hypothesis storage 24 can be implemented using any one of the ROM 105, the RAM 106, and the storage 107.

The communication device 108 communicates with an external device, and is used in receiving input of a WFSA and in outputting input symbol strings. In the case of using a WFSA that is recorded in advance and outputting input symbol strings to the display 103 or the storage 107, the search device 10 may not include the communication device 108.

The computer programs executed in the search device 10 according to the embodiment are recorded as installable or executable files in a computer-readable storage medium such as a compact disk read only memory (CD-ROM), a flexible disk (FD), a compact disk readable (CD-R), or a digital versatile disk (DVD), which may be provided as a computer program product.

Alternatively, the computer program executed in the search device 10 according to the embodiment can be saved as downloadable files on a computer connected to the Internet or can be made available for distribution through a network such as the Internet. Alternatively, the computer programs executed in the search device 10 according to the embodiment can be stored in advance in a ROM or the like.

The computer programs executed in the search device 10 according to the embodiment contain a module for each of the abovementioned constituent elements (the obtaining unit 21, the digraph storage 22, the best-path weight storage 23, the hypothesis storage 24, the retriever 25, the output unit 26, and the hypothesis expander 27). The CPU 101 (the processor) reads the computer programs from a storage medium and executes them so that each constituent element is loaded in a main storage device. As a result, the search device 10 (the obtaining unit 21, the digraph storage 22, the best-path weight storage 23, the hypothesis storage 24, the retriever 25, the output unit 26, and the hypothesis expander 27) is generated in the main memory device. Meanwhile, the search device 10 can be configured entirely or partially using hardware.

Effect

As described above, when the outgoing transitions from each of one or more states held by the target hypothesis include an empty hypothesis, the search device 10 according to the embodiment adds the state reached by following the empty transition from that state, and then continues with the search and generates a single new hypothesis. Thus, in the search device 10 according to the embodiment, it becomes possible to find out N number of input symbol strings, which do not include duplicative input symbol strings, in a sequential manner starting from the path having the best cumulative weight from the initial state to a final state.

Pattern Recognition Device

Figure 8:
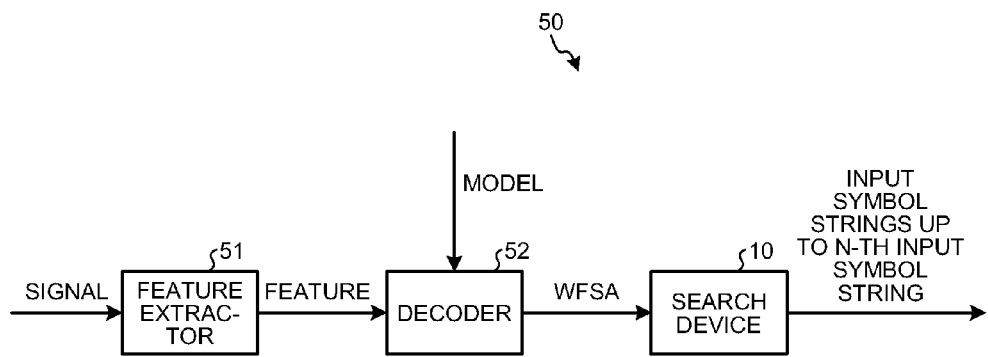
FIG. 8 is a diagram illustrating a configuration of a pattern recognition device according to the embodiment.

In FIG. 8 is illustrated a configuration of a pattern recognition device 50 according to the embodiment. Thus, given below is the explanation of the pattern recognition device 50 according to the embodiment.

The pattern recognition device 50 recognizes the pattern of input signals, and outputs N number of symbol strings as a recognition result. The signals input to the pattern recognition device 50 can be of any type as long as they represent patterns. Examples of the input signals include audio signals, signals representing handwriting, image signals representing characters, or moving-image signals representing gestures such as the sign language.

The pattern recognition device 50 includes a feature extractor 51, a decoder 52, and the search device 10.

The feature extractor 51 receives input of signals representing a pattern, and obtains the feature of the signals at regular time intervals. Then, the feature extractor 51 sends the feature of the obtained signals to the decoder 52. There are times when the feature is made of a plurality of values. In such a case, the group of a plurality of features is called a feature vector. In the embodiment, including the case in which the feature is made of a plurality of values, the term feature is used.

The feature represents information indicating the section-by-section features of a signal, and is used by the decoder 52 in calculating the signal score. When an audio signal is received as input, the feature extractor 51 obtains the feature in, for example, the units of 10 milliseconds (in the units of frames).

Every time the feature is input from the feature extractor 51, the decoder 52 performs pattern recognition using various models required in pattern identification. Then, the decoder 52 outputs the recognition result as a WFSA. The WFSA output by the decoder 52 is sometimes called a lattice.

The search device 10 is the device explained with reference to FIGS. 1 to 7. Thus, the detailed explanation the search device 10 is not repeated. The search device 10 obtains the WFSA from the decoder 52. Moreover, for each state in the WFSA, the search device 10 obtains the weight of the best path from that state to a final state.

During the process in which the paths having suitable weights are found from among the paths included in a model, the decoder 52 calculates the weights of the paths from the starting state of the processes performed by the decoder 52 to each state of the processes. If the decoder 52 is configured to generate a WFSA in which the starting state of the processes performed by the decoder 52 is treated as the final state and the state of completion of the processes of the decoder 52 is treated as the initial state, the search device 10 becomes able to obtain the weight of the best path from each state to the final state without having to separately calculate the weights. That is because of the fact that the decoder 52 has already calculated the weight of the best path from the starting state of the processes to each state of the processes. In this case, the transitions of the WFSA that is input to the search device 10 have the reverse order to the order of features input to the decoder 52. That is, later the input of a feature, closer is the transition to the initial state of the WFSA to which the input symbol corresponding to the feature is assigned. Thus, the search device 10 can be configured to reverse the arrangement of the input symbol strings immediately before outputting the input symbol strings.

Then, the search device 10 outputs the N number of input symbol strings in a non-duplicative manner and in a sequential manner starting from the best path.

Consider the case in which speech recognition is taken as an example of pattern recognition. In this case, the feature extractor 51 receives input of audio signals. Examples of the model used by the decoder 52 include an acoustic model and a word dictionary and language model. Regarding the decoder 52 that processes audio signals and outputs a lattice, the explanation is given in, for example, G. Saon, D. Pover and G. Zweig, "Anatomy of an extremely fast LVCSR decoder", in Proceedings of INTERSPEECH, 2005, PP. 549-552.

The pattern recognition device 50 can obtain the audio signals recorded in a storage device, or audio signals collected by the microphone 104, or audio signals received from the communication device 108. The lattice output by the decoder 52 is, for example, a word lattice or a phoneme lattice. In the case of processing a word lattice as a WFSA, the input symbols of the WFSA serve as the words. Similarly, in the case of processing a phoneme lattice as a WFSA, the input symbols of the WFSA serve as the phonemes.

Meanwhile, in the case of performing pattern recognition of handwritten characters, the pattern recognition device 50 further includes a handwriting input device that outputs handwriting signals as pattern signals. Alternatively, in the case of performing optical character recognition (OCR), the pattern recognition device 50 further includes a scanner or a camera that imports image signals as pattern signals. Still alternatively, in the case of performing gesture recognition, hand signal recognition, or sign language recognition; the pattern recognition device 50 further includes a video camera that imports dynamic image signals as pattern signals. In these cases, since audio signals are not required, the search device 10 may not include the microphone 104.

Process Flow

Figure 9:
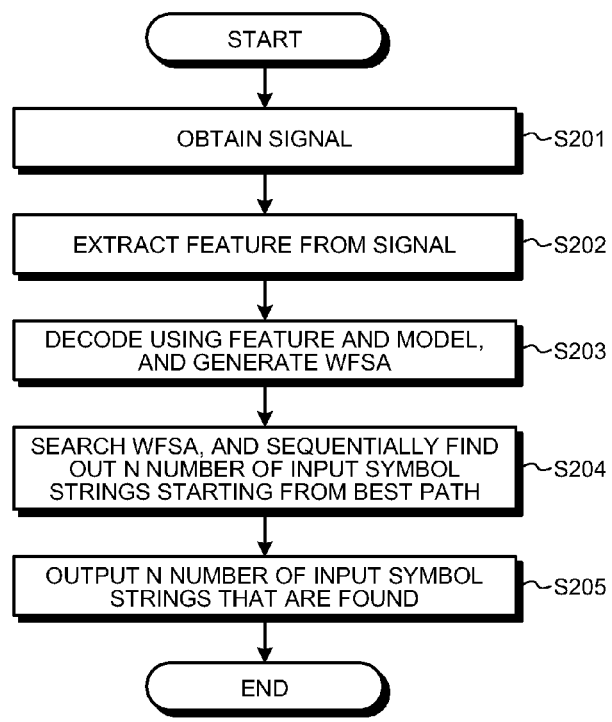
FIG. 9 is a flowchart for explaining a process flow performed by the pattern recognition device according to the embodiment.

FIG. 9 is a flowchart for explaining a process flow performed by the pattern recognition device 50 according to the embodiment. Firstly, once the input of signals starts, the pattern recognition device 50 obtains the signals (Step S201).

Then, the feature extractor 51 extracts the feature and sends it to the decoder 52 (Step S202). Subsequently, the decoder 52 searches models to generate a WFSA corresponding to the feature (Step S203).

Then, the search device 10 searches the WFSA to find N number of input symbol strings in a sequential manner starting from the best path (Step S204). Subsequently, the pattern recognition device 50 outputs the N number of input symbol strings as the recognition result (Step S205).

Meanwhile, the pattern recognition device 50 can be implemented using an identical hardware configuration to the hardware configuration illustrated in FIG. 7. Alternatively, the pattern recognition device 50 can be implemented when computer programs are executed in an identical hardware configuration to the hardware configuration illustrated in FIG. 7. The computer programs executed in the pattern recognition device 50 contain modules for the feature extractor 51, the decoder 52, and the search device 10. The CPU 101 (the processor) reads the computer programs from a storage medium and executes them so that each constituent element is loaded in a main memory device. As a result, the pattern recognition device 50 (the feature extractor 51, the decoder 52, and the search device 10) is generated in the main storage device. Meanwhile, the pattern recognition device 50 can be configured entirely or partially using hardware.

In this way, the pattern recognition device 50 can output, as the recognition result, N number of symbol strings using the search device 10 explained with reference to FIGS. 1 to 7. As a result, the pattern recognition device 50 can output, as the recognition result, the N number of non-duplicative symbol strings.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A search device that searches paths of a digraph which has input symbols and weights assigned thereto the search device comprising:

a processor and a memory comprising hypothesis storage, a retriever, and a hypothesis expander, the memory storing executable instructions that, when executed by the processor, perform operations that include:

storing in the hypothesis storage one or more hypotheses, each hypothesis of the one or more hypotheses representing information which holds an input symbol string and one or more states, each state of the states being a state of a head of a path from which the input symbol string is obtained, the input symbol string being obtained by searching the paths from an initial state of the digraph, the digraph being a weighted finite state automaton (WFSA) including at least one transition assigned with an empty input symbol, wherein the WFSA is generated by using a model corresponding to an extracted feature of a signal, and the hypothesis storage is a priority queue in which path weight is set as a priority;

for said each state of the states included in the WFSA, searching in response to a retrieval request for the paths to find out a number of non-duplicative input symbol strings, which are present in the paths from an initial state to final states, in a sequential manner starting from a path having a best cumulative weight;

retrieving, by the retriever, from among the one or more hypotheses stored in the hypothesis storage, as a target hypothesis, a single hypothesis for which a weight obtained by addition of a weight of an already-searched path corresponding to a hypothesis and a weight of a best path from a state of a head of a concerned path to a final state is a best weight, wherein the single hypothesis, which has a highest priority in the priority queue, holds an input symbol string that is obtained from the already-searched path has a best cumulative weight up to the final state;

determining whether the retrieved target hypothesis is a final hypothesis or the retrieved target hypothesis is not the final hypothesis;

responsive to the determining that the retrieved target hypothesis is not the final hypothesis for which the search has been completed up to the final state, generate, by a hypothesis expander, one or more new hypotheses, each new hypothesis of the new hypotheses holding an input symbol string that is present in a path in which the search has been performed from one or more states held by the target hypothesis until finding a single input symbol, and write the generated new hypotheses in the hypothesis storage, wherein the retriever repeatedly retrieves the target hypothesis from the hypothesis storage until a predetermined number of final hypotheses is retrieved, and the hypothesis expander comprises:

an empty transition processor configured to, when an outgoing transition from a state in the states held by the retrieved target hypothesis includes an empty transition, add to the target hypothesis a state reached by following the empty transition;

a final generator configured to, after the empty transition processor performs an operation, when the states held by the target hypothesis include the final state, generate, as the final hypothesis, a new hypothesis which holds the input symbol string held by the target hypothesis and which holds the final state from among the states held by the target hypothesis, and write the new hypothesis in the hypothesis storage; and a hypothesis generator configured to, after the empty transition processor performs an operation, generate the one or more new hypotheses and write the new hypotheses in the hypothesis storage, each new hypothesis of the new hypotheses holding an input symbol string obtained by concatenating a new input symbol at the end of an input symbol string held by the target hypothesis and holding one or more states, each state being reached by following a transition assigned with the new input symbol from a state held by the target hypothesis; and outputting the input symbol strings held by the target hypothesis as the number of non-duplicative input symbol strings.

2. The device according to claim 1, further comprising an output unit configured to, subject to a condition that the retrieved target hypothesis is the final hypothesis, output the input symbol string held by the target hypothesis, wherein
when a retrieved target hypothesis is not the final hypothesis, the retriever retrieves next of the target hypothesis in response to writing of a new hypothesis in the hypothesis storage by the hypothesis expander, and
when the retrieved target hypothesis is the final hypothesis, the retriever immediately retrieves next of the target hypothesis.

3. The device according to claim 1, wherein a hypothesis holds, as a path value, the best value from among values obtained by accumulating weights from an initial state to a final state in one or more paths from which a input symbol string held is obtained while passing through each state of one or more of held states.

4. The device according to claim 3, wherein the hypothesis generator generates a new hypothesis that further holds the path value, and writes the new hypothesis in the hypothesis storage.

5. The device according to claim 1, wherein, at a starting stage of the search, the hypothesis storage stores a hypothesis which holds an empty input symbol string and one or more initial states of the digraph.

6. The device according to claim 1, wherein the hypothesis expander adds to the target hypothesis a state having at least one outgoing transition other than an empty transition from among states reached by following empty transitions from the state.

7. The device according to claim 6, wherein, with respect to each state of one or more states held therein, a hypothesis holds a cumulative weight of the best path from an initial state to concerned state and from which the input symbol string held by the hypothesis is obtained.

8. The device according to claim 7, wherein the hypothesis expander adds, to the target hypothesis as a corresponding cumulative weight, a value obtained by adding a cumulating weight corresponding to states held by the target hypothesis and a cumulative weight of the best path from among one or more paths reached by following empty transitions from the one or more states held by the target hypothesis.

9. The device according to claim 1, further comprising an obtaining unit configured to, for each state included in the digraph, obtain in advance a weight of the best path from concerned state to a final state.

10. A search method for searching paths of a digraph which has input symbols and weights assigned thereto, the method comprising:
storing, by a processor in hypothesis storage of a memory, one or more hypotheses, wherein each hypothesis of the one or more hypotheses representing information which holds an input symbol string and one or more state states, each state of the states being a state of a head of a path from which the input symbol string is obtained, the input symbol string being obtained by searching the paths from an initial state of the digraph, the digraph being a weighted finite state automaton (WFSA) including at least one transition assigned with an empty input symbol, wherein the WFSA is generated by using a model corresponding to an extracted feature of a signal, and the hypothesis storage is a priority queue in which path weight is set as a priority;
for said each state of the states included in the WFSA, searching, by the processor, in response to a retrieval request for the paths to find out a number of non-duplicative input symbol strings, which are present in the paths from an initial state to final states, in a sequential manner starting from a path having a best cumulative weight;
retrieving, by the processor from among the one or more hypotheses stored in the hypothesis storage, as a target hypothesis, a single hypothesis for which a weight obtained by addition of a weight of an already-searched path corresponding to a hypothesis and a weight of a best path from a state of a head of a concerned path to a final state is a best weight, wherein the single hypothesis, which has a highest priority in the priority queue, holds an input symbol string that is obtained from the already-searched path has a best cumulative weight up to the final state;
determining, by the processor, whether the retrieved target hypothesis is a final hypothesis or the retrieved target hypothesis is not the final hypothesis; responsive to the determining that the retrieved target hypothesis is not the final hypothesis for which the search has been completed up to the final state, generating, by the processor, one or more new hypotheses, each new hypothesis of the new hypotheses holding an input symbol string that is present in a path in which the search has been performed from one or more states held by the target hypothesis until finding a single input symbol, and writing, by the processor, the generated new hypotheses in the hypothesis storage, the retrieving includes repeatedly retrieving the target hypothesis from the hypothesis storage until a predetermined number of final hypotheses is retrieved;
when an outgoing transition from a state in the states held by the retrieved target hypothesis includes an empty transition, adding, by an empty transition processor, to the target hypothesis a state reached by following the empty transition;
after the empty transition processor performs an operation, when the states held by the target hypothesis include the final state, generating, by the processor, as the final hypothesis, a new hypothesis which holds the input symbol string held by the target hypothesis and which holds the final state from among the states held by the target hypothesis, and writing, by the processor, the new hypothesis in the hypothesis storage; and
after the empty transition processor performs an operation, generating, by the processor, the one or more new hypotheses and writing, by the processor, the new hypotheses in the hypothesis storage, each new hypothesis of the new hypotheses holding an input symbol string obtained by concatenating a new input symbol at the end of an input symbol string held by the target hypothesis and holding one or more states, each state being reached by following a transition assigned with the new input symbol from a state held by the target hypothesis; and
outputting, by the processor, the input symbol strings held by the target hypothesis as the number of non-duplicative input symbol strings.

11. A computer program product comprising a non-transitory computer-readable medium containing a program for searching paths of a digraph which has input symbols and weights assigned thereto, the program causing a computer comprising a processor and a memory to execute instructions that, when executed by a processor, facilitate performance of operations, comprising:
storing, by the processor in hypothesis storage of a memory, one or more hypotheses, wherein each hypothesis of the one or more hypotheses representing information which holds an input symbol string and one or more state states, each state of the states being a state of a head of a path from which the input symbol string is obtained, the input symbol string being obtained by searching the paths from an initial state of the digraph, the digraph being a weighted finite state automaton (WFSA) including at least one transition assigned with an empty input symbol, wherein the WFSA is generated by using a model corresponding to an extracted feature of a signal, and the hypothesis storage is a priority queue in which path weight is set as a priority;

for said each state of the states included in the WFSA, searching in response to a retrieval request for the paths to find out a number of non-duplicative input symbol strings, which are present in the paths from an initial state to final states, in a sequential manner starting from a path having a best cumulative weight;

retrieving, by the processor from among the one or more hypotheses stored in the hypothesis storage, as a target hypothesis, a single hypothesis for which a weight obtained by addition of a weight of an already-searched path corresponding to a hypothesis and a weight of a best path from a state of a head of a concerned path to a final state is a best weight, wherein the single hypothesis, which has a highest priority in the priority queue, holds an input symbol string that is obtained from the already-searched path has a best cumulative weight up to the final state;

determining, by the processor, whether the retrieved target hypothesis is a final hypothesis or the retrieved target hypothesis is not the final hypothesis; responsive to the determining that the retrieved target hypothesis is not the final hypothesis for which the search has been completed up to the final state, generating, by the processor, one or more new hypotheses, each new hypothesis of the new hypotheses holding an input symbol string that is present in a path in which the search has been performed from one or more states held by the target hypothesis until finding a single input symbol, and writing, by the processor, the generated new hypotheses in the hypothesis storage, the retrieving includes repeatedly retrieving, by the processor, the target hypothesis from the hypothesis storage until a predetermined number of final hypotheses is retrieved;

when an outgoing transition from a state in the states held by the retrieved target hypothesis includes an empty transition, adding, by an empty transition processor, to the target hypothesis a state reached by following the empty transition;

after the empty transition processor performs an operation, when the states held by the target hypothesis include the final state, generating, by the processor, as the final hypothesis, a new hypothesis which holds the input symbol string held by the target hypothesis and which holds the final state from among the states held by the target hypothesis, and writing, by the processor, the new hypothesis in the hypothesis storage; and after the empty transition processor performs an operation, generating, by the processor, the one or more new hypotheses and writing, by the processor, the new hypotheses in the hypothesis storage, each new hypothesis of the new hypotheses holding an input symbol string obtained by concatenating a new input symbol at the end of an input symbol string held by the target hypothesis and holding one or more states, each state being reached by following a transition assigned with the new input symbol from a state held by the target hypothesis; and outputting, by the processor, the input symbol strings held by the target hypothesis as the number of non-duplicative input symbol strings.

\* \* \* \* \*